(No Model.)  2 Sheets—Sheet 1.
R. B. CHRITTON.
TRACTION ENGINE.
No. 250,055. Patented Nov. 29, 1881.
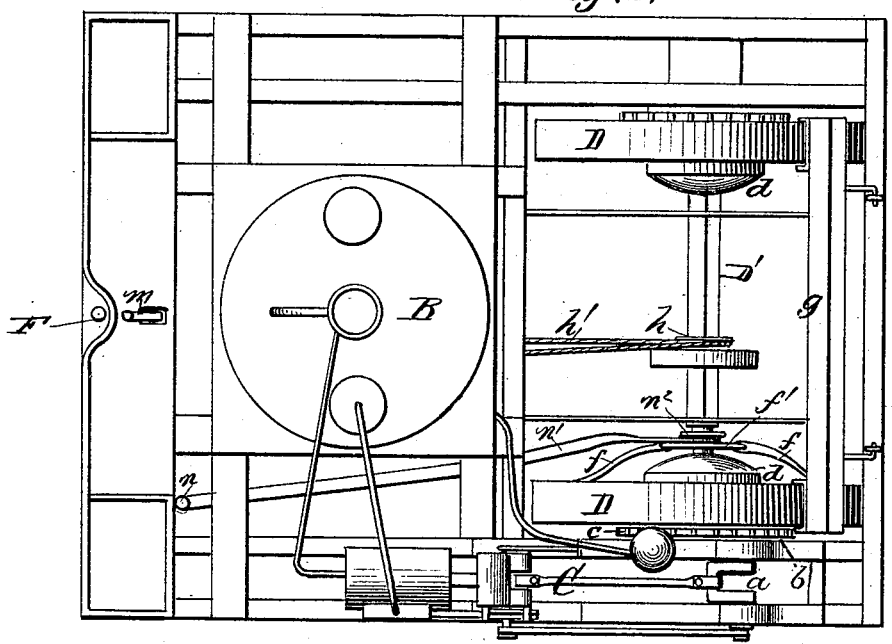
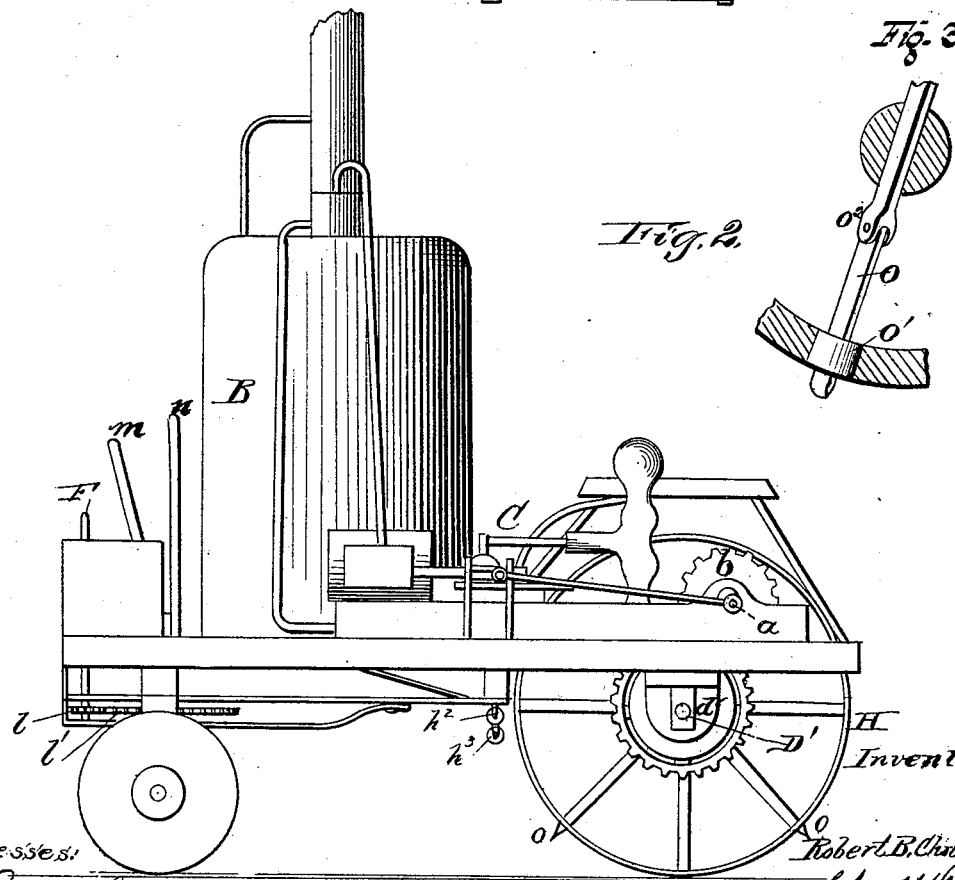
Witnesses:  Inventor:
Robert B. Chritton
per Chas. H. Tinder
Attorney.

(No Model.) 2 Sheets—Sheet 2.
R. B. CHRITTON.
TRACTION ENGINE.
No. 250,055. Patented Nov. 29, 1881.
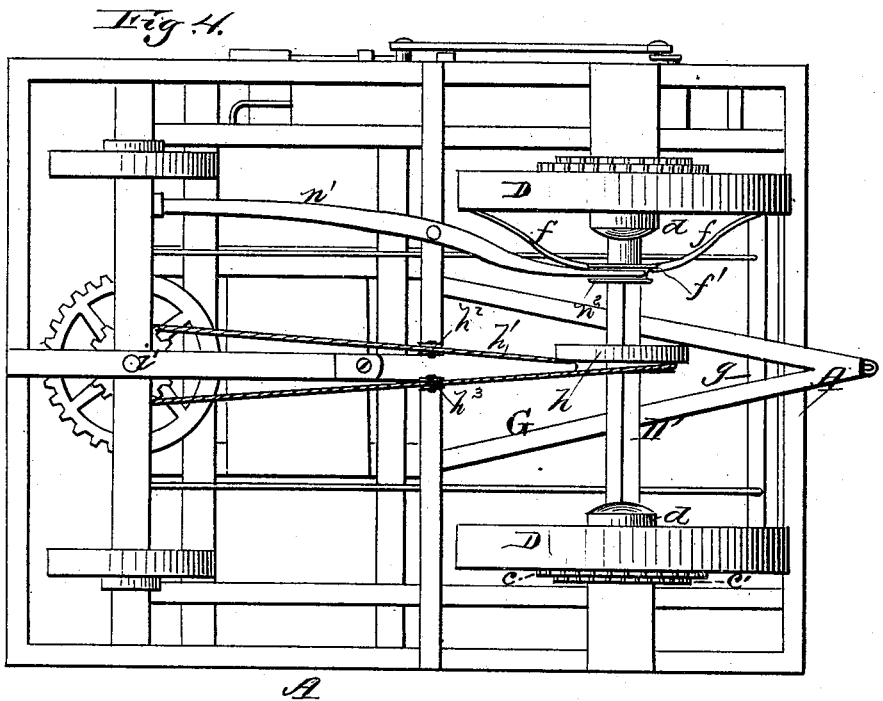
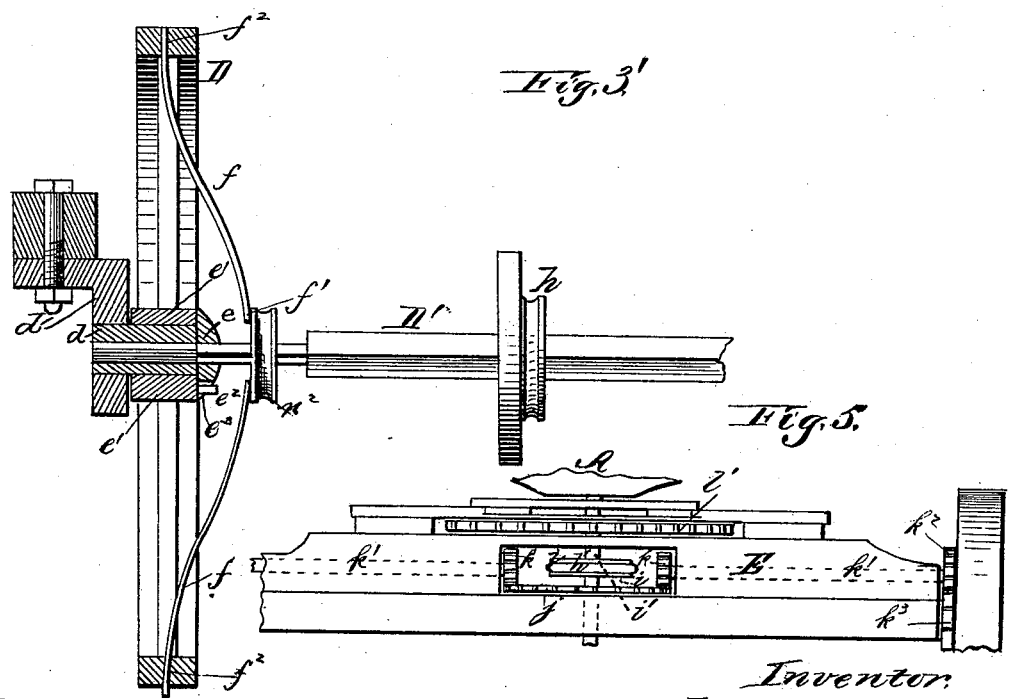
Witnesses:
Inventor:
Robert B. Chritton
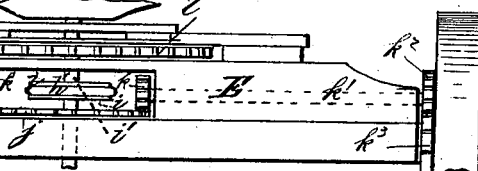
Attorney.

UNITED STATES PATENT OFFICE.

ROBERT B. CHRITTON, OF EUREKA, ILLINOIS.

TRACTION-ENGINE.

SPECIFICATION forming part of Letters Patent No. 250,055, dated November 29, 1881.

Application filed September 13, 1881. (No model.)

*To all whom it may concern:*

Be it known that I, ROBERT B. CHRITTON, a citizen of the United States, residing at Eureka, in the county of Woodford and State of Illinois, have invented certain new and useful Improvements in Traction-Engines; and I do hereby declare that the following is a full, clear, and exact description of the same, reference being had to the annexed drawings, making a part of this specification, and to the letters and figures of reference marked thereon, and in which—

Figure 1 is a top-plan view of my improved traction-engine for agricultural and other purposes. Fig. 2 is a side view with the drive-wheels replaced by the roller, and Fig. 3 is a detail section of the roller. Fig. 3' is a cross-section through the drive-wheel axle and adjuncts. Fig. 4 is an inverted view of the engine, and Fig. 5 is a detailed front view thereof.

This invention relates to improvements in traction-engines, particularly adapted for use in connection with a cultivator-plow or similar agricultural implement or roller, it also being capable of driving a pulley or shaft; and it consists of mechanism substantially as hereinafter more fully set forth.

In carrying out my invention I employ a suitable frame, A, upon which is mounted the upright boiler B, connected by steam-pipes with the engine proper, C, also secured upon said frame.

The inner end of the crank-shaft $a$ of the engine C is provided with a pinion, $b$, which gears with a large pinion or wheel, $c$, upon one of the drive-wheels D, to transmit motion to said wheels, and thus propel the machine, dispensing with the use of horse-power for that purpose.

It will be noticed that alongside of the pinion $c$ there is a second but smaller pinion or toothed wheel, $c'$, its object being to permit of the replacing of the pinion $c$ with a larger one to gear with the wheel $c'$ when it is desired to increase the driving motion—as, for instance, in driving or transmitting motion to a belt, pulley, or shaft. To apply the motor or engine to the the latter purpose the frame is elevated to lift the drive-wheels from the ground, when the said wheels can be converted into pulleys, and thus serve to drive a belt passing around the driving-pulley of the machine to be operated.

The drive-wheels D are adapted to revolve each upon a short cylinder, $d$, fixed in a removable hanger-box, $d'$, adjusted to the under side of the frame A. The axle D', which is connected by a disk, $e$, fixed or caused to turn with the axle to each wheel-hub $e'$, having a pin, $e^2$, moving in a vertical slot, $e^3$, in said disk, bears or revolves eccentrically in the short cylinders or eccentrics $d$, upon which the wheels revolve.

From the foregoing it will be noticed that the wheels have an eccentrically rotary movement upon their axle, the object of which will appear presently. One of the wheels D is armed with spurs composed of radial bars or rods $f$ connected to a disk, $f'$, fitted upon the axle D', and adapted to move in slots $f^2$ in the periphery of the wheel. These spurs, the purpose of which is to enable the wheel or wheels to more readily ascend or climb an up-grade or overcome the slipping of the wheels upon ice, it will be observed, by reason of the aforesaid movement ascribed to the wheels, are projected at the points of contact of the latter with the ground, and are retracted at the other points, as clearly seen. The retracting of the spurs permits of the application to the wheels of the scraper $g$ to remove adhering dirt, &c.

Upon the axle D' is a pulley, $h$, around which passes a belt, $h'$, passing in contact with small pulleys $h^2 h^3$, depending from about the middle of the under side of the frame A. The belt $h'$ transmits motion to the forward steering-wheels. It passes around a pulley, $i$, upon an upright shaft, $i'$, Fig. 5, supported in an opening in the front axle-bolster, E. This shaft has also a crown-wheel, $j$, gearing with pinions $k$, one upon the inner end of each of two shafts, $k'$, supported in said bolster, and having also pinions $k^2$ at their outer ends, gearing with pinions $k^3$ upon the steering-wheels.

The steering of the machine is effected by operating the hand shaft or staff F at the forward end of the frame A, which has a pinion, $l$, at its lower end, gearing with a toothed circle, $l'$, fixed to the front axle-bolster, E. At the same end of the machine is a lever, $m$, connecting with and for operating—*i. e.*, applying or taking off—the scraper $g$, and also a lever, $n$, suitably connected by a lever, $n'$, forked to a collar, $n^2$, sliding upon the axle $D'$ and secured to the disk $f'$, to the spurs $f$, for readily sinking all of the spurs below the periphery of the wheel, though it may be in motion, when it is desired to dispense with their action.

G is a forked draft-bar, pivoted or hung in the frame A, and extending rearward for the attachment thereto of the cultivator, plow, or other agricultural implement. To use the roller H, whose construction is, in common with that of the ordinary roller, and the eccentricity of its action upon its shaft the same as that described in connection with the drive-wheels upon their axle, the said wheels are removed by first withdrawing the short eccentrics or cylinders $d$ attached to the readily-removable boxes $d'$, and then replacing them with the roller, omitting the frame connected to said roller, and using the same boxes and eccentrics for the roller. The roller is also supplied with spurs $o$, operated in like manner as those of the drive-wheel, but, unlike them, are capable of presenting their points in different positions to the ground by being swiveled, as at $o^2$, and inserted in sleeves $o'$, inserted in cylinder H, so as to be turned to effect the aforesaid change. The roller has mounted above it a seat for the operator, and is supplied with a scraper, as the drive-wheels.

Having thus fully described my invention, I claim and desire to secure by Letters Patent—

1. In a traction-engine for agricultural and other purposes, the combination, with the fixed eccentric $d$ and the drive-wheel D, of the axle $D'$, connected by a disk, $e$, having a slot, $e^3$, to the wheel-hub, having a pin, $e^2$, entering the slot $e^3$ of the disk, and the spurs $f$ arranged upon the axle, substantially as and for the purpose set forth.

2. In a traction-engine, the drive-wheel axle $D'$, having a pulley, around which passes a belt, in combination with a shaft located in an open bolster, and having a pulley and a crown-wheel gearing with pinions upon shafts having at their opposite ends pinions gearing with pinions upon the front steering-wheels, substantially as set forth.

3. The combination, with the sleeve $o'$, inserted into the periphery of the drum or cylinder, of the spur $o$, swiveled, as at $o^2$, to permit of presenting the points of the spurs in different positions to the ground, substantially as set forth.

In testimony that I claim the above I have hereunto subscribed my name in the presence of two witnesses.

ROBERT B. CHRITTON.

Witnesses:
B. F. MAUPIN,
C. T. COLESON.